United States Patent Office 3,331,818
Patented July 18, 1967

1

3,331,818
HIGH RANK POLYSULFIDE POLYMERS, PROCESS AND PRODUCTS
Eugene R. Bertozzi, Yardley, Pa., assignor to Thiokol Chemical Corporation, Bristol, Pa., a corporation of Delaware
No Drawing. Continuation of application Ser. No. 290,637, June 26, 1963. This application Sept. 30, 1966, Ser. No. 583,480
20 Claims. (Cl. 260—79.1)

ABSTRACT OF THE DISCLOSURE

The invention herein relates to liquid polymers having SSH terminals and recurring high sulfur rank groupings, and to the process for making such polymers by reacting sulfur with liquid polythiopolymercaptan polymers.

---

This application is a continuation application of S.N. 290,637 filed June 26, 1963, now abandoned.

The present invention relates to high sulfur rank liquid polysulfide polymers, to the process by which they are prepared and to products made therewith.

Conventional, liquid polysulfide polymers and their preparation are disclosed in U.S. 2,466,963. According to the process disclosed therein, the conventional liquid polymers, which have —SH terminals, are formed by "splitting" solid, high molecular weight polysulfide polymers. The solid polymers are formed, generally, by reacting alkaline polysulfides with organic dihalides, i.e., $Na_2S_4 + Cl—R—Cl \rightarrow 2_nNaCl + (RS_x)_n$ wherein R may represent the ethyl formal radical $$—CH_2—CH_2—O—CH_2—O—CH_2—CH_2$$

$x$ is the sulfur rank of the alkaline polysulfide and the resulting solid polysulfide polymer and can be varied from 1 to 5, and $n$ is the degree of polymerization and is about 2000 to 4000 for the solid polymers described above.

To improve cold flow resistance and other physical properties of the solid polymers, a small amount, about 0.1 to 2 mol. %, of a crosslinking agent having a halide functionality of 3 or more, such as, trichloropropane, trichloroethane, bis dichloropropyl formal, chlorinated paraffins and $\beta$, $\beta'$, $\gamma$, $\gamma'$ tetrachloro normal propyl ether, is incorporated in the solid polymer to obtain branching of the polymer chains. This crosslinking agent joins in the main polymer chain formation through two of its halide groups in a manner similar to the use of the organic dihalide discussed above. As a result, there are one or more chlorine groups remaining unreacted on the resulting polymer chains per crosslinking group which react with the alkaline polysulfide, as disclosed above, to form a branched polymer chain.

To obtain the lower molecular weight, mercaptan terminated liquid polymers the solid polymers are "split," as noted above, with a "splitting agent." The splitting agent acts as a reducing agent to cleave the polysulfide groups, as shown as follows with a solid polymer having a sulfur rank of 2:

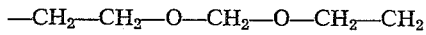

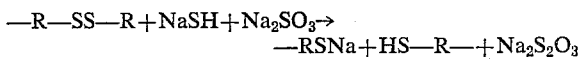

2

A neutralizing coagulating agent such as acetic acid is used to coagulate the resulting liquid polymer suspension and convert the terminal —RSNa groups to terminal —RSH groups. The liquid polymer is then washed, dried, filtered and packaged. It has not been possible to date, as far as the applicant is aware, to form liquid polysulfide polymers, as described above, which have a sulfur rank of higher than 2.0. By having a sulfur rank of no higher than 2.0 it is meant, according to the present invention, that the sulfur linkages joining the recurring hydrocarbon, oxahydrocarbon or thiahydrocarbon radicals in the chain of the liquid polymer, contain an average of 2.0 or less sulfur atoms per linkage. In fact, none of the linkages in the conventional liquid polymers will ever contain more than two sulfur atoms and some will contain only one sulfur atom. Although the precursor solid polymer may have a sulfur rank of more than 2.0 the sulfur in excess of rank 2.0, or isosulfur as it is referred in U.S. 2,466,963, is partially or completely removed or stripped from the solid polymers as disclosed in U.S. 2,278,128 before the solid polymers are split to liquid polymers as disclosed in 2,466,963 and the remaining isosulfur, if any, is removed during the splitting or oxidation operation of 2,466,963. Solid polymers having a sulfur rank of 2.5 are also disclosed in U.S. 3,053,816. The conventional liquid polymers which have a rank of 2.0 or less, moreover, when cured to a solid elastomer, have limited resistance to certain solvents and require the use of a curing agent to effectuate the cure thereof.

An object of the present invention, therefore, is to provide liquid polysulfide polymers, which, when cured to solid elastomers, are more resistant to solvents than are the cured conventional liquid polysulfide polymers.

Another object of the present invention is to provide a curable, liquid polysulfide polymer which can be readily cured at room temperature upon exposure to the atmosphere without the use of a catalyst.

It has been unexpectedly found according to the present invention that liquid polysulfide polymers which can be cured at room temperature without the use of a catalyst and which have substantially greater solvent resistance in cured form than the cured conventional liquid polysulfide polymers may be formed by reacting the conventional liquid polymers with elemental sulfur to form a liquid polymer having —SSH terminals, a sulfur rank of about 1.6 to 5.0 and preferably about 2.5 to 3.5 and at least some sulfur linkages between the recurring hydrocarbon, oxahydrocarbon or thiahydrocarbon radicals which contain more than two sulfur atoms.

The novel polymers of the present invention which have a sulfur rank of more than 4.0 are not as storage stable as those of lower rank and those having a sulfur rank of more than 3.5 tend to be opaque which factor is a deterrent in coating applications. The novel polymers of the present invention may be formed from conventional liquid polymers having a sulfur rank of less than 2.0. The difference in sulfur content between the two polymers is that whereas the sulfur linkages in the conventional polymers will never have more than two sulfur atoms in any one linkage because of the reactions involved in making these polymers and may have some linkages with only one sulfur atom therein, the novel polymers of the present invention will always contain at least some linkages which have more than two and up to five sulfur atoms therein even though the average sulfur rank of all the linkages may be less than two because, when elemental sulfur is added to the conventional liquid polymers it will only add to the disulfide linkages and the conventional —SH terminal groups but it will never add to any monosulfide linkages that may be present. The presence of the —SSH terminals in the novel polymers of the present invention is attested to by the bright yellow color of the uncured polymer. The polymers of the present invention in cured form as well as the conventional liquid polymers, cured or uncured, have a drab color. As a matter of fact, the disappearance of the bright yellow color from the novel liquid polymers of the present invention, during the cure thereof, is a means of evaluating the state of cure of these polymers during the cure reaction which results in the removal of the —SSH terminals from these polymers as discussed below.

The conventional liquid polymers as discussed herein are those polythio- polymercaptan liquid polymers produced as described in U.S. 2,466,963. These polymers have a molecular weight of about 500 to 12,000 and are liquid, i.e., pourable, at room temperature (about 25° C.). Structurally, they may be described as $$HS(-R-S_x)_n-R-SH$$

wherein the average of all $x$'s is 1.5 to 2.0, $n$ may be about 2 to 70 and R is a hydrocarbon, oxahydrocarbon or thiahydrocarbon radical such as $$-C_4H_8-O-CH_2-O-C_4H_8$$

$$-C_4H_8-O-C_4H_8- \text{ and}$$

$$-C_2H_4-O-CH_2-O-C_2H_4-$$

When these polymers are reacted with elemental sulfur, according to the present invention, it is believed that the reaction proceeds as follows:

$$HS(-RS_r-)_nRSH + (np+2)S \rightarrow HSS(-RS_{r+p}-)_nRSSH$$

wherein the average of all $r$'s is 1.5 to 2.0, $p$ is 0.1 to 3.0, $n$ is 2 to 70 and $r+p$ is the desired sulfur rank, $x$, which, for any one linkage, may be 1 to 5 and for the average of all the linkages is about 1.6 to 5.0. The reaction can be carried out at moderate temperatures of about 20 to 50° C. in an open vessel but preferably under an inert gas such as nitrogen. To obtain polymers having a sulfur rank in excess of about 3.0, however, it is preferable to conduct the reaction in the presence of about 0.5 to 10% by weight of an amine catalyst such as triethylamine, dibutyl amine or n-butyl amine.

Triethylamine is the preferred catalyst since it tends to promote the fastest reaction times. The reactions can be accomplished in about 2–12 hours. A small amount of water may also be used with the amine to facilitate the use of the catalyst. It is believed that the water promotes the solubility and dispersion of the amine in the reaction system. Solvents such as dimethylformamide may be used if desired in the more viscous systems.

When packaged in an inert atmosphere such as under nitrogen the high sulfur rank liquid polymers of the present invention are stable for prolonged periods of time. Upon exposure to the atmosphere, however, $H_2S$ volatilizes from the polymer and the liquid polymer cures to a solid, solvent resistant elastomer. It is believed that the —R—S—S—H terminated liquid polymers cure as follows:

$$2(-R-S-SH) \rightarrow (-R-S_x-R-) + H_2S$$

No curing agent is needed to facilitate the cures of these polymers at room temperature.

The uncatalyzed cures, however, require extended cure times. The novel polysulfide polymers of the present invention can be cured more readily, however, with the aid of inorganic and organic peroxide curing agents such as lead peroxide which peroxides will also cure the conventional low sulfur rank polymers. The novel high sulfur rank polymers can also be readily cured with curing agents such as lead oxide, zinc oxide, calcium oxide and calcium hydroxide which will not readily, if at all, cure the conventional low sulfur rank polymers.

The novel high sulfur rank liquid polymers can be used to form solvent resistant films and coatings for roof coatings and other applications by exposing a film of the polymer to the atmosphere, in the presence or absence of one or more of the catalysts mentioned above, and allowing the polymer film to cure. The application of heat will expedite the cure. The cured polymers of the present invention are exceptionally resistant to solvents and exhibit a much greater resistance to solvents such as toluene than is shown by the cured conventional liquid polysulfide polymers.

The high sulfur rank liquid polymers of the present invention can also be used to prepare curable sealants or caulking compositions in combination with the curing agents mentioned above and the fillers, plasticizers, pigments and other adjuvants known to the art. The following examples are merely illustrative of the present invention and are not intended as a limitation upon the scope thereof.

Examples 1 to 18

In the following examples, the materials, in the amount indicated in the table, were charged into a three-necked, glass reaction flask. For the 200 gram polysulfide polymer charge, a 500 ml. flask was used; where 400 grams polysulfide polymer charge was employed, a one liter flask was used. The order of charge was: liquid polysulfide polymer, sulfur, amine catalyst and water. The reaction was carried out under an atmosphere of nitrogen with continuous agitation. No external heat was applied and the reaction proceeded at the reaction temperature indicated in the example table. The reaction temperature was partially due to the heat of friction produced when the viscous reactants were agitated and partially to the exotherm produced by the reaction. The reaction was continued until the sulfur dissolved, the time varying from 2½ to 11 hours as indicated.

In Examples 1 to 14 the liquid polysulfide polymer used had essentially the following structure:

$$HS(C_2H_4-O-CH_2-O-C_2H_4-S-S)_{23}-C_2H_4-O-CH_2O-C_2H_4-SH$$

while in Examples 15–18 the liquid polysulfide polymer had essentially the following structure:

$$HS-(C_2H_4-O-CH_2-O-C_2H_4-S-S)_6-C_2H_4-O-CH_2-O-C_2H_4-SH$$

The reactions described above resulted in viscous materials which were usable as produced, the recovery being 100% in each case.

A portion of each of the prepared samples was charged into collapsible metal tubes to observe the stability of the polymer when protected from the atmosphere. When packaged in these sealed containers and protected from the atmosphere the uncured, high sulfur rank polymers remain stable for extended periods of time. Another portion of each of the prepared materials was formed into a thin bead to observe cure results when the material was exposed to the atmosphere. The results of these tests are indicated in the table.

The resultant samples can also be cured by using conventional liquid polysulfide polymer curing techniques

| Example No. | Liquid Polymer, gms. | Sulfur, gms. | Catalyst [1] Amt., cc. | Catalyst [1] Type | Water, cc. | Reaction Time, hrs. | Reaction Temp., °C. | Polymer, Sulfur Rank | Results Beads Skinned, hours | Results Beads Cured, days |
|---|---|---|---|---|---|---|---|---|---|---|
| 1 | 200 | 100 | 2 | DBA | ½ | 6½ | 22–35 | 4.60 | 1–2 | 14 |
| 2 | 200 | 50 | 2 | DBA | ½ | 3 | 23–53 | 3.30 | 1–2 | 14 |
| 3 | 200 | 100 | 10 | DBA | ½ | 6½ | 27–55 | 4.60 | 2 | 14 |
| 4 | 200 | 50 | 10 | DBA | ½ | 3 | 24–52 | 3.30 | 2 | 14 |
| 5 | 200 | 100 | ¼ | DBA | ½ | 6½ | 24–56 | 4.60 | 2 | 14 |
| 6 | 200 | 50 | ¼ | DBA | ½ | 5 | 40–50 | 3.30 | 2 | 14 |
| 7 | 400 | 20 | 4 | DBA | 1 | 2½ | 28–50 | 2.26 | 16 | 14 |
| 8 | 400 | 40 | 4 | DBA | 1 | 2½ | 22–46 | 2.52 | 16 | 14 |
| 9 | 400 | 20 | 20 | DBA | 1 | 3½ | 28–42 | 2.26 | 1 | 14 |
| 10 | 400 | 40 | 20 | DBA | 1 | 3½ | 28–51 | 2.52 | 1 | 14 |
| 11 | 400 | 20 | 4 | TEA | 1 | 2½ | 25–42 | 2.26 | 24 | 14 |
| 12 | 400 | 20 | 20 | TEA | 1 | 2½ | 25–42 | 2.26 | 24 | 14 |
| 13 | 400 | 40 | 4 | TEA | 1 | 2½ | 24–44 | 2.52 | 24 | 14 |
| 14 | 400 | 40 | 20 | TEA | 1 | 2½ | 24–40 | 2.52 | 24 | 14 |
| 15 | 200 | 50 | 2 | DBA | ½ | 8 | 24–37 | 3.30 | 24 | 14 |
| 16 | 200 | 100 | 2 | DBA | ½ | 10 | 28–42 | 4.60 | 24 | 12 |
| 17 | 200 | 50 | ¼ | DBA | ½ | 4 | 24–39 | 3.30 | 24 | 8 |
| 18 | 200 | 100 | ¼ | DBA | ½ | 11 | 24–35 | 4.60 | 24 | 7 |

[1] Abbreviations.—DBA=n-Dibutylamine. TEA=Triethylamine.

Example 19

The following reactants were charged, in the order given, into a 500 ml. glass reaction flask: 200 grams of a liquid polysulfide polymer having essentially the formula

HS(C$_4$H$_8$—O—CH$_2$—O—C$_4$H$_8$—SS)$_6$C$_4$H$_8$—O—CH$_2$—O—C$_4$H$_8$—SH 43.2 grams of powdered sulfur, N.F., 0.25 ml. of triethylamine, and 0.5 ml. of distilled water. The reaction was conducted under a nitrogen atmosphere, with continuous agitation, until the sulfur dissolved which required about four hours. During this reaction interval, the temperature of the system varied between 40 and 60° C. The resultant liquid polymer, having a sulfur rank of 3.5, cured on exposure to the atmosphere in 2–6 hours. When protected from the atmosphere, the polymer was stable for an extended period of time.

Example 20

A high sulfur rank liquid polymer was prepared as outlined in Example 19 using 200 grams of a liquid polysulfide polymer having essentially the formula

HS(C$_4$H$_8$—O—C$_4$H$_8$—SS)$_6$C$_4$H$_8$—O—C$_4$H$_8$—SH 49.7 grams of sulfur, 0.25 ml. of triethylamine and 0.5 ml. of distilled water. The reaction temperature of this system varied between 40–58° C. and the resultant polymer, having a sulfur rank of 3.5, cured as outlined in Example 19.

I claim:

1. A composition of matter stable in an inert atmosphere and curable to a solid elastic state upon exposure to the atmosphere comprising a liquid polythiopolymercaptan polymer having in its polymeric chain recurring radicals selected from the group consisting of hydrocarbon and oxahydrocarbon radicals linked by sulfur linkages wherein at least some of said sulfur linkages contain more than two sulfur atoms and the average sulfur rank of all of said linkages is about 1.6 to 5.0.

2. A composition of matter as in claim 1 in which said liquid polymer has —SSH terminal groups.

3. A composition of matter as in claim 1 in which said sulfur linkages have an average sulfur rank of about 2.5 to 4.0.

4. The cured composition of matter of claim 1.

5. The cured composition of matter of claim 1 in the form of a film.

6. A process comprising exposing the composition of matter of claim 1 to the atmosphere to effectuate the cure thereof.

7. A composition of matter stable in an inert atmosphere and curable to a solid elastic state upon exposure to the atmosphere comprising a liquid polythiopolymercaptan polymer having the structure HSS(RS$_x$)$_n$—RSSH in which R is selected from the group consisting of hydrocarbon and oxahydrocarbon radicals, $n$ is about 2 to 70 and $x$ is a whole number which may vary from 1 to 5 from sulfur linkage to sulfur linkage and the average $x$ of all of said linkages is about 1.6 to 5.0.

8. A composition of matter as in claim 7 in which $x$ is more than 2 in at least some of said sulfur linkages.

9. A composition of matter as in claim 7 in which R is an oxahydrocarbon radical.

10. A composition of matter as in claim 9 in which R is —C$_2$H$_4$—O—CH$_2$—O—C$_2$H$_4$—.

11. A composition of matter as in claim 10 in which $n$ is about 6 to 23.

12. A composition of matter as in claim 9 in which R is —C$_4$H$_8$—O—CH$_2$—O—C$_4$H$_8$—.

13. A composition of matter as in claim 9 in which R is —C$_4$H$_8$—O—C$_4$H$_8$—.

14. A process comprising exposing the sealant composition of claim 7 to the atmosphere to effectuate the cure thereof.

15. A process comprising reacting, as the sole reactants and with continuous agitation under an inert atmosphere, sulfur with a liquid polythiopolymercaptan polymer having in its polymeric chain recurring radicals selected from the group consisting of hydrocarbon and oxahydrocarbon radicals linked by sulfur linkages only selected from the group consisting of —S— and —S—S— to form a liquid polythiopolymercaptan polymer having —SSH terminals and a sulfur rank of about 1.6 to 5.0.

16. A process as in claim 15 in which said reaction is conducted in the presence of an amine catalyst.

17. A process as in claim 16 in which said catalyst is selected from the group consisting of dibutyl amine, n-butyl amine and triethyl amine.

18. A process as in claim 17 in which said catalyst is dibutyl amine.

19. A process as in claim 17 in which said catalyst is triethyl amine.

20. A process as in claim 16 in which said amine catalyst is dissolved in the reaction system with the aid of water.

References Cited

UNITED STATES PATENTS

| | | | |
|---|---|---|---|
| 2,216,044 | 7/1938 | Patrick | 260—79.1 |
| 2,235,621 | 3/1941 | Patrick | 260—79.1 |
| 2,731,437 | 1/1956 | Bender et al. | 260—79.1 |
| 2,875,182 | 2/1959 | Fettes et al. | 260—79 |
| 2,986,582 | 5/1961 | Martin et al. | 260—79.1 |
| 3,038,883 | 6/1962 | Forman | 260—79.1 |
| 3,046,248 | 7/1962 | Molnar | 260—79.1 |
| 3,053,816 | 9/1962 | Stone | 260—79 |
| 3,054,781 | 9/1962 | Tson | 260—79.1 |

DONALD E. CZAJA, *Primary Examiner.*

LEON J. BERCOVITZ, M. I. MARQUIS,
*Assistant Examiners.*